US009093053B2

(12) United States Patent
Jungeberg et al.

(10) Patent No.: US 9,093,053 B2
(45) Date of Patent: Jul. 28, 2015

(54) ARRESTOR FOR USER OPERATED DEVICES

(71) Applicants: Kenneth Alvin Jungeberg, Liberty Township, OH (US); Eddie Lee Luckey, Sr., Cincinnati, OH (US)

(72) Inventors: Kenneth Alvin Jungeberg, Liberty Township, OH (US); Eddie Lee Luckey, Sr., Cincinnati, OH (US)

( * ) Notice: Subject to any disclaimer, the term of this patent is extended or adjusted under 35 U.S.C. 154(b) by 194 days.

(21) Appl. No.: 13/669,236

(22) Filed: Nov. 5, 2012

(65) Prior Publication Data

US 2013/0112059 A1    May 9, 2013

Related U.S. Application Data

(60) Provisional application No. 61/555,295, filed on Nov. 3, 2011.

(51) Int. Cl.
| | |
|---|---|
| G10C 3/26 | (2006.01) |
| G10D 13/00 | (2006.01) |
| G10D 13/02 | (2006.01) |
| G10D 13/06 | (2006.01) |
| G10G 7/00 | (2006.01) |

(52) U.S. Cl.
CPC .. G10G 7/00 (2013.01); G10C 3/26 (2013.01); G10D 13/006 (2013.01); G10D 13/065 (2013.01)

(58) Field of Classification Search
CPC .... G10D 13/006; G10D 13/065; A47K 13/10
USPC ............ 84/231, 225, 422.1, 422.3; 248/176.1
See application file for complete search history.

(56) References Cited

U.S. PATENT DOCUMENTS

| | | | |
|---|---|---|---|
| 2,711,352 A | 6/1955 | Hasko et al. ................... 308/72 |
| 2,785,022 A | 3/1957 | Lakey ........................... 308/160 |
| 3,539,208 A | 11/1970 | Gonsalves ..................... 287/12 |
| 3,550,636 A | 12/1970 | Hearne .......................... 138/89 |
| 3,768,879 A | 10/1973 | Dee ................................. 308/9 |
| 3,776,649 A | 12/1973 | Kemezys ...................... 403/90 |
| 3,960,416 A | 6/1976 | McCloskey .................... 308/72 |
| 4,105,261 A | 8/1978 | Myers et al. .................... 308/72 |
| 4,248,486 A | 2/1981 | Bradley, Jr. .................... 308/72 |
| 4,673,376 A | 6/1987 | Fender .......................... 464/158 |
| 4,856,406 A * | 8/1989 | Ohmuro ......................... 84/419 |
| 5,990,401 A * | 11/1999 | Braun et al. .................. 84/422.1 |
| 6,075,192 A * | 6/2000 | Hoshino ..................... 84/422.3 |
| 6,166,312 A * | 12/2000 | Brewster et al. ............. 84/422.1 |
| 6,188,007 B1 * | 2/2001 | Liao ............................ 84/422.3 |
| 6,325,544 B1 | 12/2001 | Sasaki et al. ................ 384/192 |
| 6,331,666 B1 * | 12/2001 | Chang ......................... 84/422.1 |

(Continued)

OTHER PUBLICATIONS

Web page from www.pedalstop.com website, visited Nov. 28, 2012.

(Continued)

*Primary Examiner* — David Warren
*Assistant Examiner* — Christina Schreiber
(74) *Attorney, Agent, or Firm* — Howard M. Cohn; Daniel Cohn

(57) ABSTRACT

An arrestor restricts the movement of a user operated device and is designed to allow flexible placement of the user operated device and subsequent locking to an adjacent object. While one function is to fix a foot pedal relative to a keyboard stand, the foot pedal arrestor can also be applied to any user operated device associated with a broad spectrum of applications. These range from musical instruments through foot operated industrial equipment and office equipment to in home devices such as sewing machines and recreational equipment such as boat motor controllers.

17 Claims, 10 Drawing Sheets

(56) References Cited

U.S. PATENT DOCUMENTS

| | | | |
|---|---|---|---|
| 6,368,321 B1 | 4/2002 | Jackson | 606/61 |
| 6,528,714 B1* | 3/2003 | Liao | 84/422.3 |
| 6,632,990 B2* | 10/2003 | Menzel et al. | 84/422.1 |
| 6,742,750 B2 | 6/2004 | Burr | 248/188.4 |
| 6,860,638 B2 | 3/2005 | Fish | 384/300 |
| 6,913,410 B2 | 7/2005 | Blanke | 403/141 |
| 6,982,374 B2* | 1/2006 | Hsieh | 84/422.1 |
| 7,037,022 B2 | 5/2006 | Schönhoff et al. | 403/114 |
| 7,135,633 B2* | 11/2006 | Miyajima et al. | 84/422.1 |
| 7,246,781 B2 | 7/2007 | Nam | 248/516 |
| 7,629,525 B1* | 12/2009 | Lin | 84/422.1 |
| 7,696,422 B1* | 4/2010 | Chang | 84/422.1 |
| 8,212,133 B2* | 7/2012 | Chen | 84/422.1 |
| 2002/0037117 A1 | 3/2002 | Sasaki et al. | 384/208 |
| 2002/0097932 A1 | 7/2002 | Roberts et al. | 384/108 |
| 2005/0036722 A1 | 2/2005 | Sato et al. | 384/192 |
| 2005/0109192 A1* | 5/2005 | Miyajima et al. | 84/422.1 |
| 2010/0005948 A1* | 1/2010 | Romolino | 84/422.3 |
| 2010/0043592 A1* | 2/2010 | Johansson | 74/560 |
| 2010/0125302 A1 | 5/2010 | Hammil et al. | 606/308 |
| 2011/0035866 A1* | 2/2011 | Ricca | 4/246.3 |
| 2012/0291610 A1* | 11/2012 | Sassmannshausen et al. | 84/422.1 |
| 2013/0077904 A1* | 3/2013 | Jungeberg | 384/215 |
| 2013/0112059 A1* | 5/2013 | Jungeberg et al. | 84/225 |

OTHER PUBLICATIONS

Web page from www.creepnomore.com website, visited Nov. 28, 2012.

* cited by examiner

ARRESTOR FOR USER OPERATED DEVICES

PRIORITY

This application takes priority from U.S. Provisional Patent Application 61/555,295 filed Nov. 3, 2011, the content of which is incorporated herein by reference.

BACKGROUND

When musical keyboards are played, whether in practice, for recreation, or in performance, foot pedals are often used to control various sound producing aspects of the instrument being played. Especially, though not solely, with electronic keyboards, these foot pedals are not anchored to the floor but are simply placed on the floor at a comfortably operable position where the foot of the player can easily reach them. Secured on the floor by at most a rubber pad attached to the bottom of the foot pedal assembly, the foot pedals are free to move and pressing on them with the foot while playing tends to move them about. This is especially so when the instrument or music being played causes the musician to move about. Sometimes the foot pedals move so much that they slide out of reach of the musician altogether with concomitant reduction in music quality as the musical composition often must continue without adjustment of the instrument set-up, especially a foot pedal on the floor.

In the past people have used various techniques to stop such movement of their musical instruments from tying ropes between the musical instrument or foot pedal and the musician's seat to placing ribbed pads on the floor with mechanical stops to keep the instrument foot pedals from moving out of reach of the musician. In some cases, often with keyboard instruments such as electronic organs or keyboards, foot pedals are secured to the instrument and are electrically connected to the instrument through the securing mechanism. However, when free floating foot pedals are used, a mechanism is needed to keep the foot pedal from moving.

Further, different musicians often find that they would like to locate their foot pedals in particular positions depending on the surroundings and playing situations at different performances. Alternatively, sometimes more than one musician plays the same instrument. In both of these situations it is desirable to not only statically locate the foot pedal, but it is desirable to be able to adjust the position of a foot pedal as needed.

The above considerations also hold for other situations where foot pedals are used such as in the control of industrial equipment. In the industrial situation it is often even more desirable to be able to move a foot operated device from one static position to another and have it remain static once located, since different operators often use the same equipment, for example, after shift changes.

The need also extends into the home where various foot pedal operated devices are used. An example of these would be a home portable sewing machine where a foot pedal is used to run the machine. Foot pedals supplied with such machines are often disposed at the end of a flexible electric cord, and they tend to move around when they are operated causing great frustration on the part of the operator.

From the above discussion it is clear that a foot pedal arrestor is needed that can adjust the position of a foot pedal to accommodate an operator and hold the foot pedal statically in place relative to the operator once positioned.

Electronic musical keyboards frequently have one or more foot pedals associated with them which rest on the floor and are electrically connected to the keyboard via a wired connection. Although usually equipped with a skid resistant pad the pedals are still prone to moving away from the musician as the pedals are repeatedly pressed. When this happens the musician has to pull the pedal back into position using his hands or feet, an especially annoying process in the middle of a performance.

Typically, musicians try to prevent this pedal movement by placing a brick or a piece of equipment or anything heavy behind the pedal, but there is no existing device available to specifically address the problem.

SUMMARY

An arrestor for user operated devices such as foot pedals is designed to allow flexible placement of a the device and subsequent locking to adjacent fixed structures such as a keyboard stand or other statically located object. While one function is to fix a foot pedal relative to a keyboard stand, the foot pedal arrestor can also be applied to any foot pedal associated with a broad spectrum of devices. These range from musical instruments through foot operated industrial equipment and office equipment to in home devices such as sewing machines and even to recreational equipment such as boat motor controllers.

A mechanical foot pedal arrestor is provided that is intended to restrict the movement of a foot pedal either resting on a surface or intended to be held in some other position by capturing the foot pedal in a fitting and fixing the location of the fitting relative to a fixed supporting element. The fixed supporting element can be a structural member or a part of an apparatus being operated by the foot pedal, or the supporting element can be independent of a device being operated by the foot pedal.

In embodiments where the foot pedal needs to be located statically in a position relative to the apparatus, this is accomplished by spanning the distance between the pedal capture fitting and the apparatus using an articulated structural arm which is connected to the apparatus by a fixed connection locator and comprises a locking joint connected to a capture fitting and structural apparatus for spanning needed separations between the point of attachment and the location of the foot pedal.

The device can statically position a foot pedal on a fixed surface such as a floor or in a suspended position, and locates the foot pedal in adjustably fixed position with respect to the object to which a fixed connection locator is attached.

BRIEF DESCRIPTION OF THE DRAWINGS

For a more complete understanding and appreciation of this invention and many of its advantages, reference should be made to the following, detailed description taken in conjunction with the accompanying drawings wherein.

DETAILED DESCRIPTION

Figure 1:
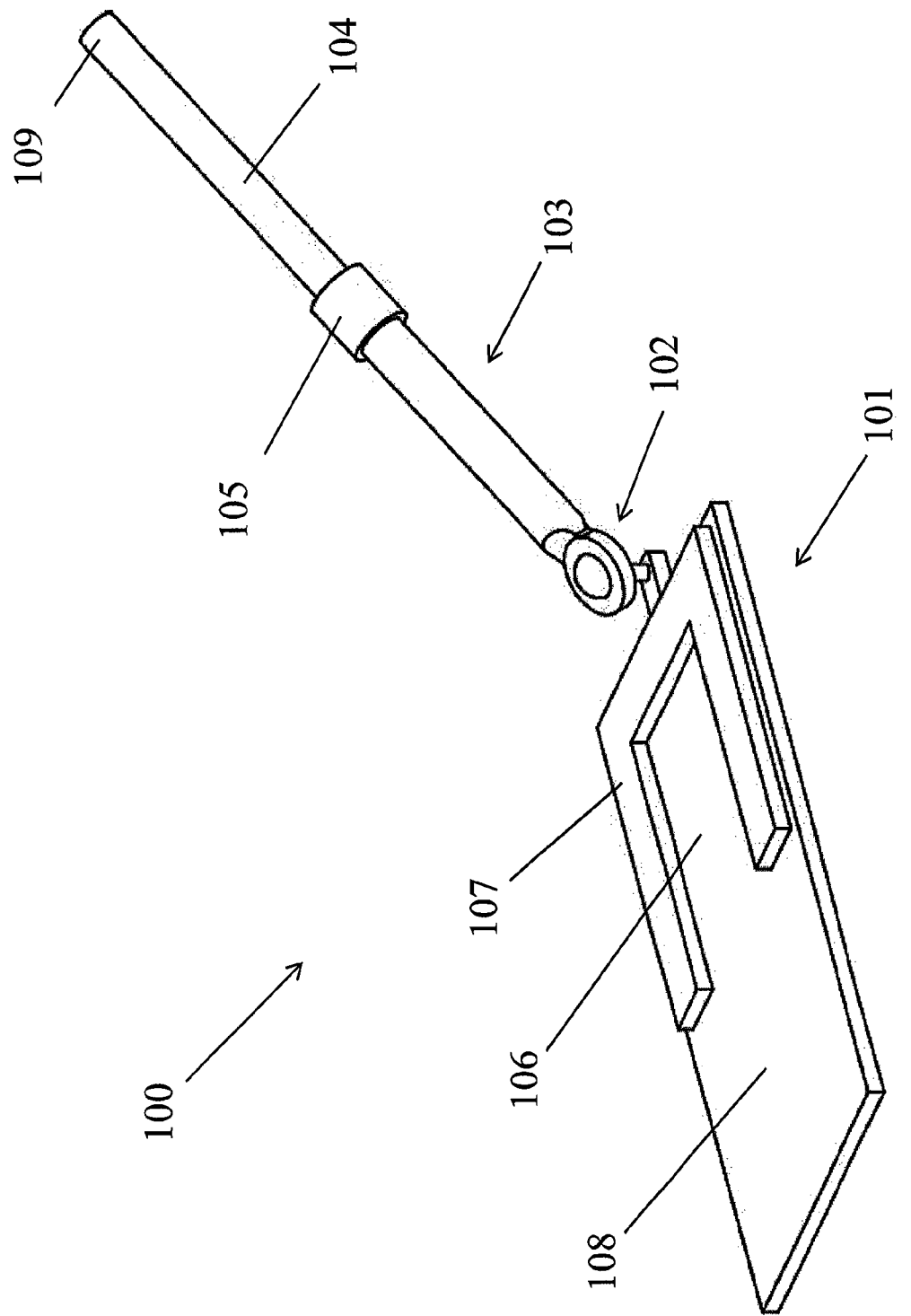
FIG. 1 depicts a portion of a foot pedal arrestor of the invention.

FIG. 1 is a portion of a foot pedal arrestor 100 of the invention comprising a foot pedal capture fitting 101, an adjustable joint 102, a distance spanning shaft 103 which comprises a lockable extension shaft 104, and a compression lock 105. In the embodiment shown, the foot pedal capture fitting 101 comprises a foot pedal pocket 106 for engaging a foot pedal, not shown, to limit the foot pedal's movement and prevent the foot pedal from sliding free.

In use a foot pedal apparatus would be placed in the foot pedal pocket 106. The foot pedal capture fitting 101 comprises a foot pedal engagement element 107 fixedly mounted on a bottom board 108 either of which can attach to the adjustable joint 102. As shown in FIG. 1, the bottom board 108 is attached to the adjustable joint 102.

The bottom board 108 helps hold the foot pedal in the pocket 106 and keeps the foot pedal from slipping out of the arrestor 100.

The foot pedal arrestor 100 can be attached to a static element in the vicinity of the foot pedal arrestor 100 as discussed above. In FIG. 1 no attachment mechanism is shown. However, the static attachment point 109 of the foot pedal arrestor extension shaft 104 could be attached to the static element using a simple clamp, such as a "C" clamp, or the arrestor 100 could be bolted to a static element or could be attached in some other way.

Should the foot pedal arrestor 100 or the static attachment point 109 move during operation of the foot pedal, the bottom board 108 keeps the foot pedal from slipping out of the capture fitting 101.

The adjustable joint 102 and the extendable shaft 103 allow positioning of the foot pedal and foot pedal pocket 106 as desired for ease of operation of the foot pedal by a user.

The adjustable joint 102 can be built with varying degrees of stiffness to allow the joint 102 to be more or less movable as desired.

Figure 2:
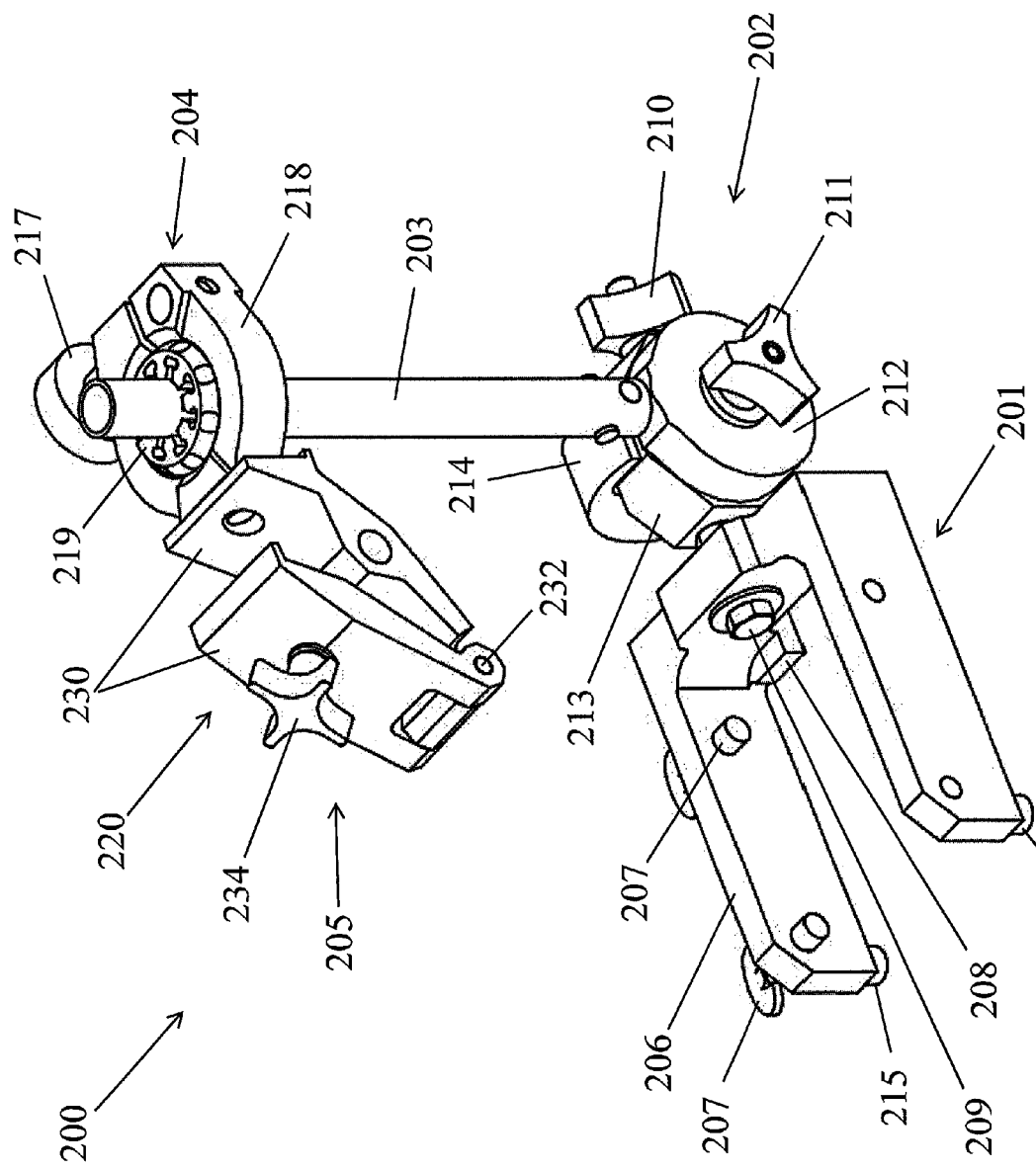
FIG. 2 depicts a foot pedal arrestor of the invention.

Another embodiment is shown in FIG. 2, which is a foot pedal arrestor 200 comprising a foot pedal capture fitting 201, a foot pedal capture lock 202, a distance spanning shaft 203, a locking spherical joint 204, and a fixed connection locator 205.

The foot pedal capture fitting in the embodiment shown is a clevis capture fitting comprising a "U" shaped yoke 206 with two pins 207 for capturing a foot pedal within the yoke 206. The pins 207 could be thumb screws or could be spring loaded locking pins or some other lockable mechanism that would restrict the movement of the foot pedal in the capture fitting 201. As shown, the fitting 201 also comprises a locator bumper 208 which is added to further restrict the movement of the foot pedal in the fitting 201 as the pedal is operated.

The capture lock 202 is connected to the capture fitting 201 by a threaded bolt 209 which runs through the capture fitting 202 and is in threaded communication with a locking knob 210. The locking knob 210 can be used to eliminate rotation of the capture fitting 201 relative to the capture lock 202 when tightened securely or, by minimizing the tightening torque, can be used to make the connection between the capture fitting 201 and the capture lock 202 rotationally free about the bolt 209 resolving the rotational position of the capture fitting 201 by its contact with the floor.

The capture lock 202 also comprises a pinch knob 211 which can further immobilize the fitting 201 by frictionally locking the shaft 203 to the capture fitting 201. Frictional locking is accomplished by pressing the friction fitting 213 and friction disk 212 together using the pinch knob 211 as shown, the pinch knob 211 having a threaded bolt running through the friction fitting 213 and friction disk 212 for the purpose of drawing them together. It should be noted that the surfaces of the friction fitting 213 and friction disk 212 could comprise splines, teeth or other treatment to enhance frictional locking.

As shown, the capture lock 202 also comprises a floor bumper 214 that supports the lock 202 and gives the distal end of the capture fitting 201/capture lock 202 assembly additional stability so that as the foot pedal is operated repeatedly, stress on the capture lock 202 will not tend to loosen the capture lock 202 and allow the foot pedal to move. The capture fitting 201 also comprises two additional floor bumpers 215, 216 on the proximal end of the capture fitting 201 and can provide three-point contact with the floor through the floor bumpers 214, 215, 216.

The shaft 203 is immovably attached to the friction disk 212 and spans the distance between a locking spherical joint 204 and the capture lock 202. The shaft 203 is attached to the locking spherical joint 204 which provides adjustability both rotationally and linearly along the length of the shaft 203 and also allows the bottom assembly 201, 202 to be positioned against the floor as needed. By releasing a locking knob 217 the shaft 203 is free to move within the clamp 218 and the spherical insert 219 can be positioned as needed. Once in position the joint 204 is immobilized when the knob 217 is tightened to eliminate movement of both the insert 219 and the shaft 203 by frictionally binding the elements together.

In FIG. 2 the fixed connection locator 205 is attached to the spherical joint clamp 218 and comprises a clamping mechanism 220 which can be used to attach the entire foot pedal arrestor 200 to a fixed object. The clamping mechanism 220 includes two clamp arms 230 connected at a clamp pivot 232 for engaging the fixed object. A clamp knob 234 allows the clamp arms to be tightened and locked in fixed engagement with the fixed object. The fixed object can be fixed with respect to the device being operated or played such as a connection to a keyboard stand would provide. This type of connection would allow the foot pedal arrestor 200 to remain in a fixed position relative to the keyboard stand, which in most cases could still be moved if needed.

Figure 3:
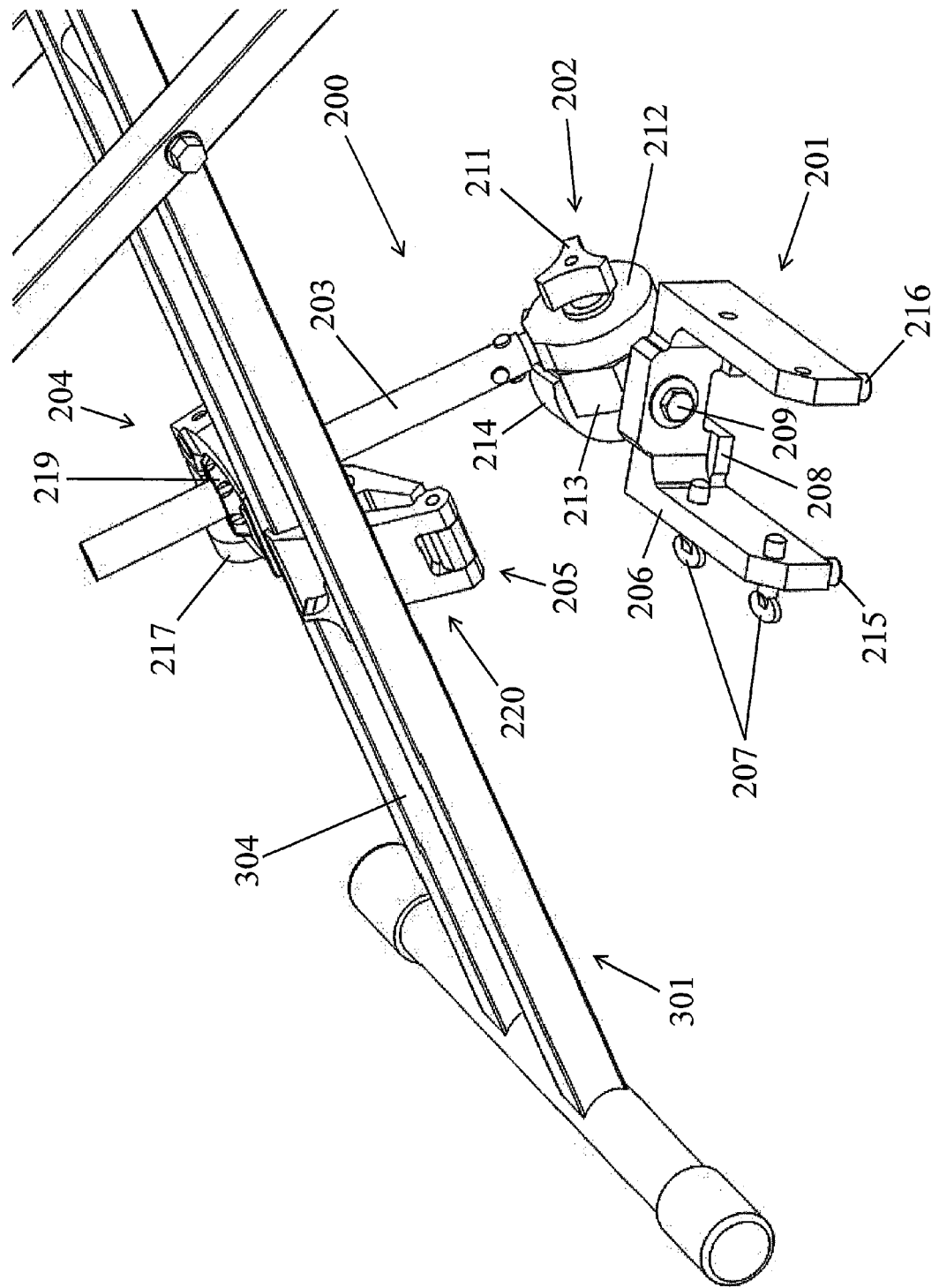
FIG. 3 depicts the foot pedal arrestor of FIG. 2 attached to a keyboard stand.

For example, FIG. 3 depicts the foot pedal arrestor 200 of FIG. 2 typically positioned and secured to a keyboard stand 301 with the foot pedal capture fitting 201 resting on the floor. The clamping mechanism 220 is shown tightened to secure the foot pedal arrestor 200 to an approximately diagonally oriented leg 304 of the stand 301.

Referring again to FIG. 2, alternatively, the locator 205 can be attached to an independent object and immobilized to remain in fixed position with respect to that object.

In other embodiments the floor bumpers 214, 215, 216 can be optionally eliminated from the foot pedal arrestor 200 and the lockable mechanisms 201, 202, 204 of the foot pedal arrestor 200 can be locked in position to suspend a foot pedal at any position with respect to the position of the fixed connection locator 205 within the limits of the physical size and reach of the components comprising the arrestor. In some embodiments, the materials and elements of the foot pedal arrestor can be made of materials and sizes that are robust enough to support a foot pedal suspended in an arbitrary position allowing for the forces that are applied to the apparatus when in use.

Figure 4:
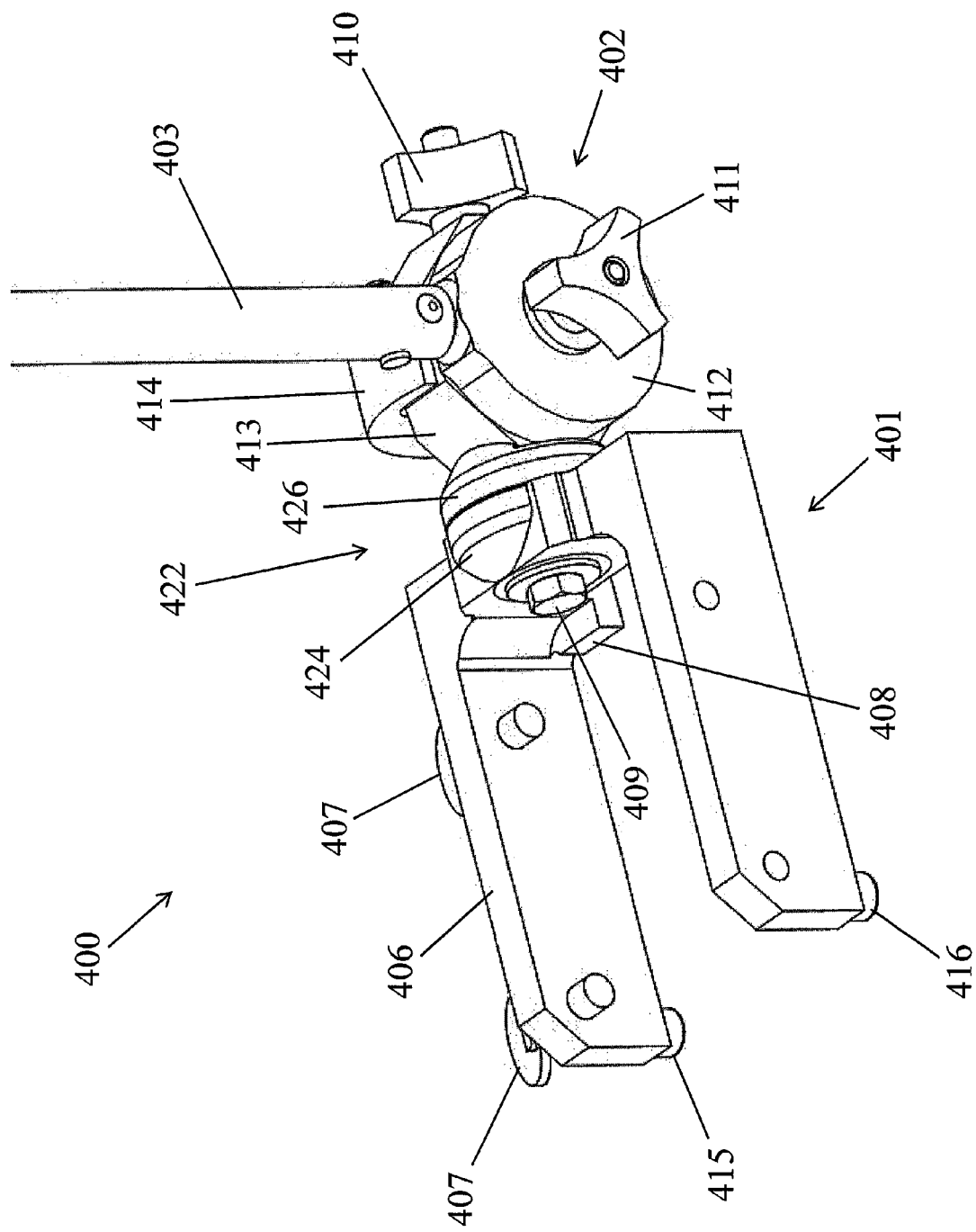
FIG. 4 depicts a portion of a foot pedal arrestor of the invention.

FIG. 4 depicts an embodiment foot pedal capture fitting 401 and foot pedal capture lock 402 of a foot pedal arrestor 400 in which the yoke 406 of the foot pedal capture fitting 401 attaches to the capture lock 402 via an anti-rotation joint 422. The anti-rotation joint 422 is formed from a yoke friction segment 424 having an increased surface contact area for engaging with a corresponding increased surface contact area of a lock friction segment 426 of the foot pedal capture lock 402. When the locking knob 410 is turned to tighten the bolt 409, the increased surface areas of the yoke friction segment 424 and lock friction segment 426 engage tightly to prevent rotational movement of the yoke 406 about the axis of the bolt 409, even when the foot pedal capture fitting 401 is suspended above the floor by the distance spanning shaft 403, although floor bumpers 414, 415, and 416 are still provided in case it is desired to rest the foot pedal capture fitting 401 on the floor.

Although it is contemplated that in some embodiments, the contact surfaces (not shown) of the yoke friction segment 424 and lock friction segment 426 are smooth to maximize contact friction, it will be appreciated that in other contemplated embodiments, toothed, geared, notched, or other such interconnection surface configurations are possible to further prevent undesired rotation of the yoke 406 about the axis of the bolt 409. When the pinch knob 411 is then turned to tighten the friction disk 412 to the friction fitting 413 of the foot pedal capture lock 402, the yoke 406 can be essentially set to a fixed, immobilized position with respect to the spanning shaft 403, even when the yoke 406 is suspended above the floor. Securing a foot pedal to the yoke 406 with pins 407 thereby allows the pedal to be set to a fixed position with respect to the arrestor 400, and its attached stand or object, even if said position leaves the pedal suspended above the floor.

Figure 5:
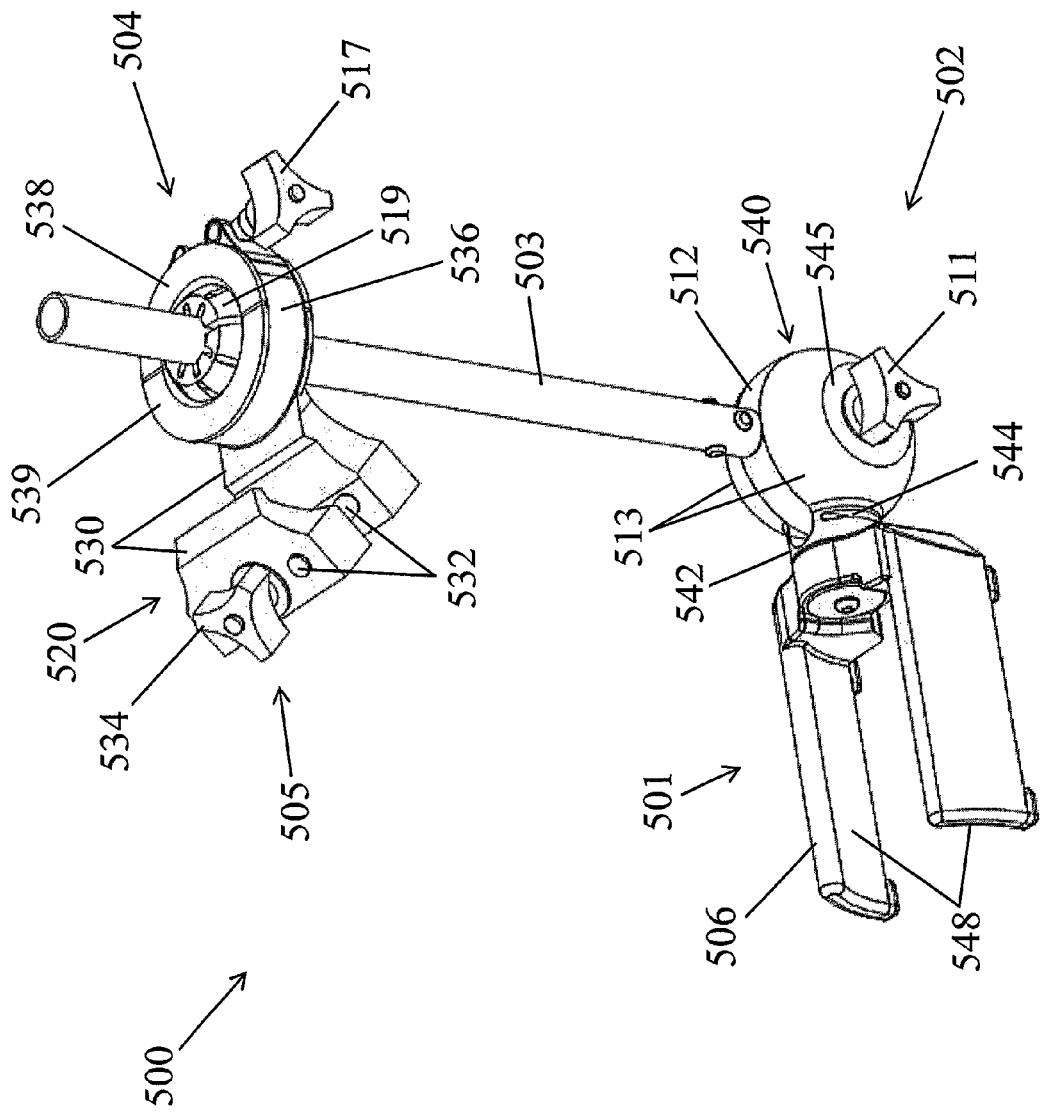
FIG. 5 depicts a foot pedal arrestor of the invention.

The invention also contemplates variations in the connection locator and the accommodation of foot pedals of different shapes and configurations. For example, FIG. 5 depicts an embodiment foot pedal arrestor 500 of the invention having a fixed connection locator 505 connected to the locking spherical joint 504 where the connection locator 505 includes a clamping mechanism 520 in which tightening the clamp knob 534 allows the clamp arms 530 to engage a stand or object in a vise fashion as one clamp arm moves along rails 532. The locking spherical joint 504 is an external clamping mechanism in which the knob 517 is used to tighten or adjust a strap clamp 536 around the clamp housing segments 538 and 539 surrounding the spherical insert 519 of the joint 504 to secure positioning of the distance spanning shaft 503. The foot pedal capture lock 502 includes a ball element 540 including two friction segments 513.

Figures 6A, 6B:
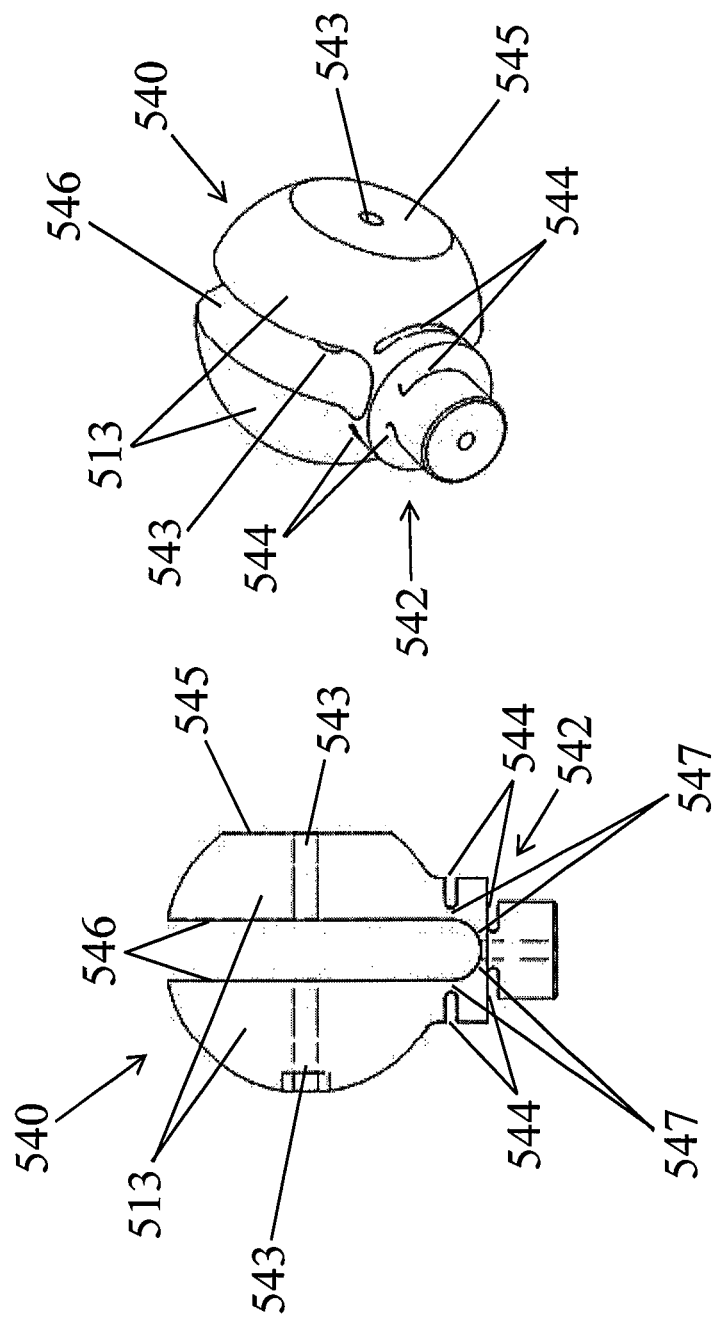
FIG. 6A depicts a ball element according to the invention.
FIG. 6B depicts the ball element of FIG. 6A.

Referring briefly to the ball element views in FIGS. 6A and B, the friction segments 513 are connected to a stem portion 542 of the ball element 540. A knob hole 543 extends through both friction segments 513, and a flat surface 545 allows for the attachment of a pinch knob 511 as best understood with comparison to FIG. 5. Relief cuts 544 are added in the stem portion 542. Further comparing FIGS. 6A and B with FIG. 5, the relief cuts 544 form narrow material areas 547 that act like hinges to allow the inside surfaces 546 of the friction segments 513 to remain parallel when they are squeezed by the pinch knob 511 against the friction disk 512 attached to the distance spanning shaft 503. Overall stabilization is therefore improved as the foot pedal capture lock 502 involves the squeezing of four joint surfaces rather than two.

Referring again to FIG. 5, the yoke 506 of the foot pedal capture fitting 501 is constructed with a universal shape including inside contact contours 548 that allow for the proper fitting to most available foot pedals without further adjustment, eliminating the need for adjustment pins.

Figure 7:
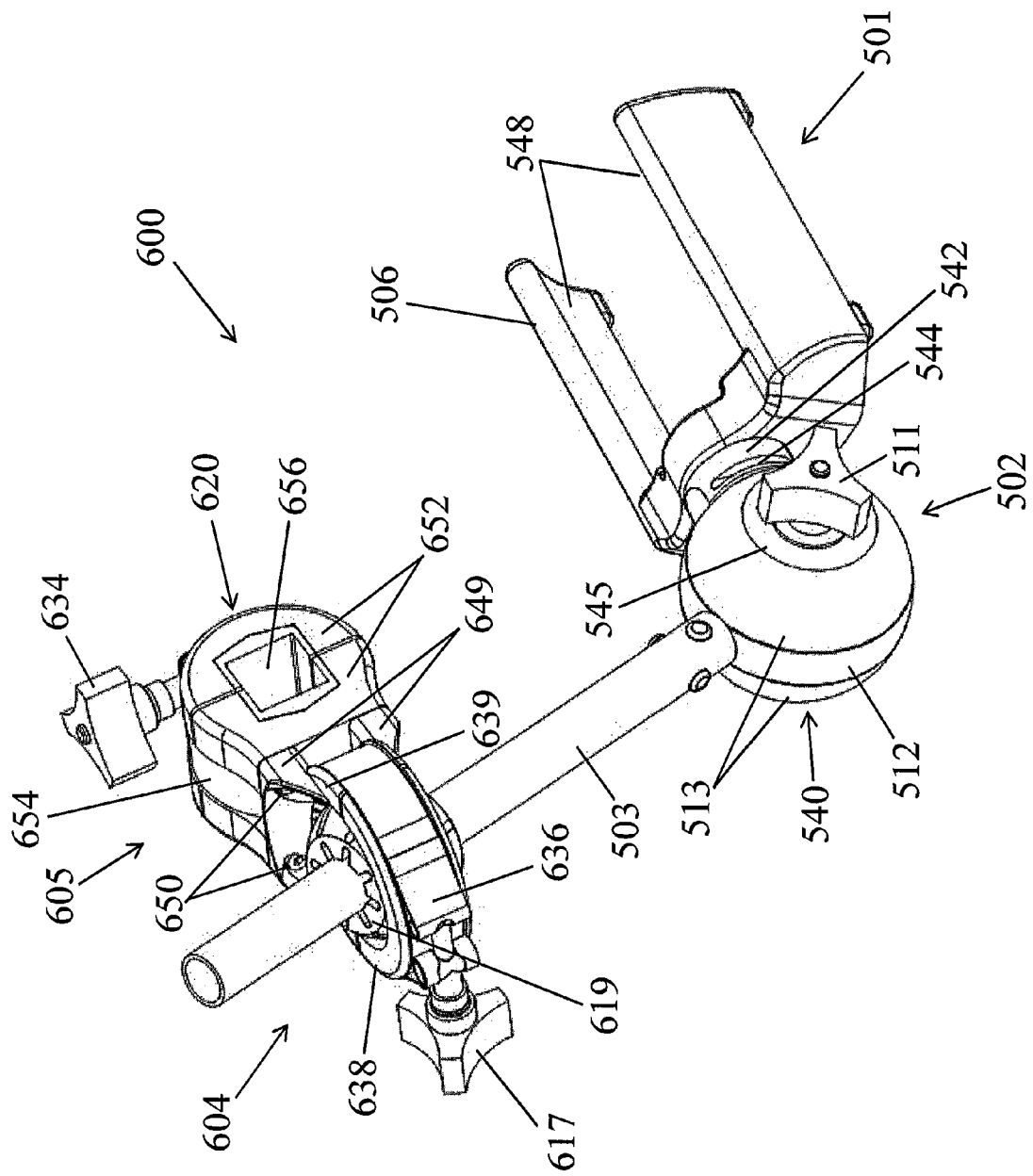
FIG. 7 depicts a foot pedal arrestor of the invention.

Additional components can also be substituted within the anticipated scope of the invention to allow for variations in the stand or object to which the foot pedal arrestor is attached. For example FIG. 7 depicts a reconfigured foot pedal arrestor 600 that is constructed using the foot pedal capture fitting 501, foot pedal capture lock 502, and distance spanning shaft 503 of the foot pedal arrestor 500 of FIG. 5. In the reconfigured foot pedal arrestor 600 of FIG. 7, the ball element 540 and pinch knob 511 have been rotated so that the pinch knob 511 is adjustable from the opposite side of the foot pedal arrestor 600 as shown.

Figure 8:
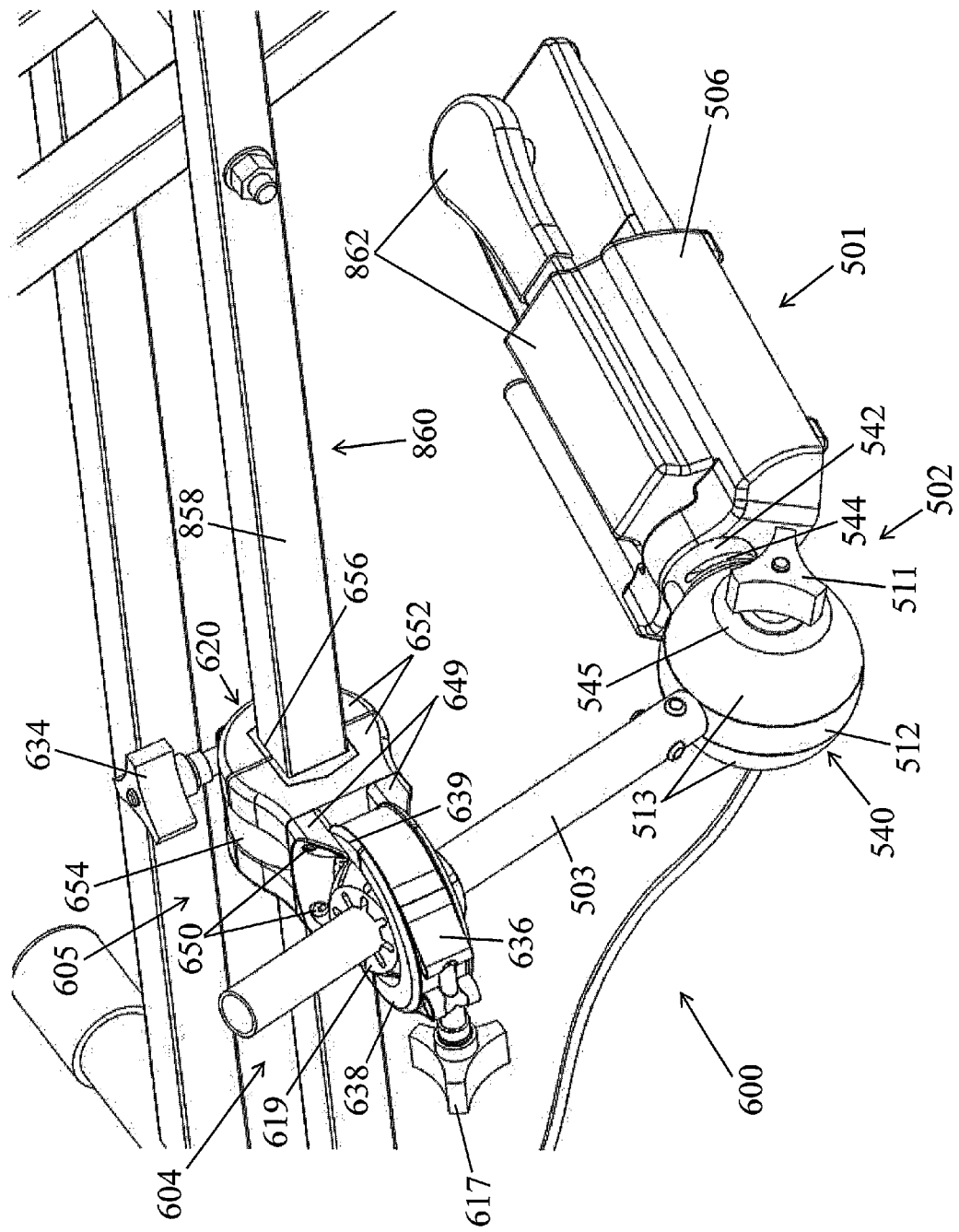
FIG. 8 depicts the foot pedal arrestor of FIG. 7 attached to a keyboard stand and securing a foot pedal of a keyboard in position.

The reconfigured foot pedal arrestor 600 of FIG. 7 includes a substituted fixed connection locator 605 and also includes a knob 617 for adjusting a strap clamp 636 around the clamp housing segments 638 and 639 surrounding the spherical insert 619 of the locking spherical joint 604 to secure positioning of the distance spanning shaft 503. The clamp housing segment 639 contains clamp mount feet 649 to which the clamping mechanism 620 is affixed with mounting screws 650. The clamping mechanism 620 is a two-piece wrap-around clamp that includes two clamp halves 652 joined together with a band clamp 654 which is itself adjustable with knob 634. Each of the clamp halves includes a cut out section that forms a portion of the engagement notch 656 which tightens around a stand or other object. Referring briefly to FIG. 8, the clamping mechanism is shown engaging an approximately diagonally-oriented leg 858 of a keyboard stand 860 to secure the foot pedal arrestor 600 in position. A foot pedal 862 of a keyboard is also shown secured in position by the foot pedal capture fitting 501.

Variations that incorporate simplifications to various invention components are also anticipated to be within the contemplated scope of the invention. For example, FIG. 9 discloses a foot pedal arrestor 900 of the invention in which the fixed connection locator 905 and locking joint 904 are integrated into a combined fixed connection locator and locking joint for attachment to a keyboard stand or other affixed object. The distance spanning shaft 903 has a square cross sectional shape to allow for direct engagement with the clamping mechanism 920. The clamping mechanism 920 includes two clamp halves 952 joined together with a strap clamp 936 tightened with a knob 934. Each of the clamp halves 952 of the clamping mechanism 920 includes one of two engagement notches 956 for accommodating and engaging either the distance spanning shaft 903 or a structural member of an attached keyboard stand or other object when the strap clamp 936 is tightened around the clamping mechanism 920. Two strap clamp depressions 962 are provided along approximately perpendicular planes to allow the strap clamp 936 to be reoriented to move the knob 934 to a more convenient adjustment position according to the user's preference or specific space constraints due to positioning of the foot pedal arrestor 900. A strap attachment screw 953 further secures the strap clamp 936 within the clamp depression 962. The strap attachment screw 953 can be removed and screwed to a corresponding location on the opposing clamp half 952 to allow for more optimal positioning of the tightening knob 934 for some installation requirements.

Figure 9:
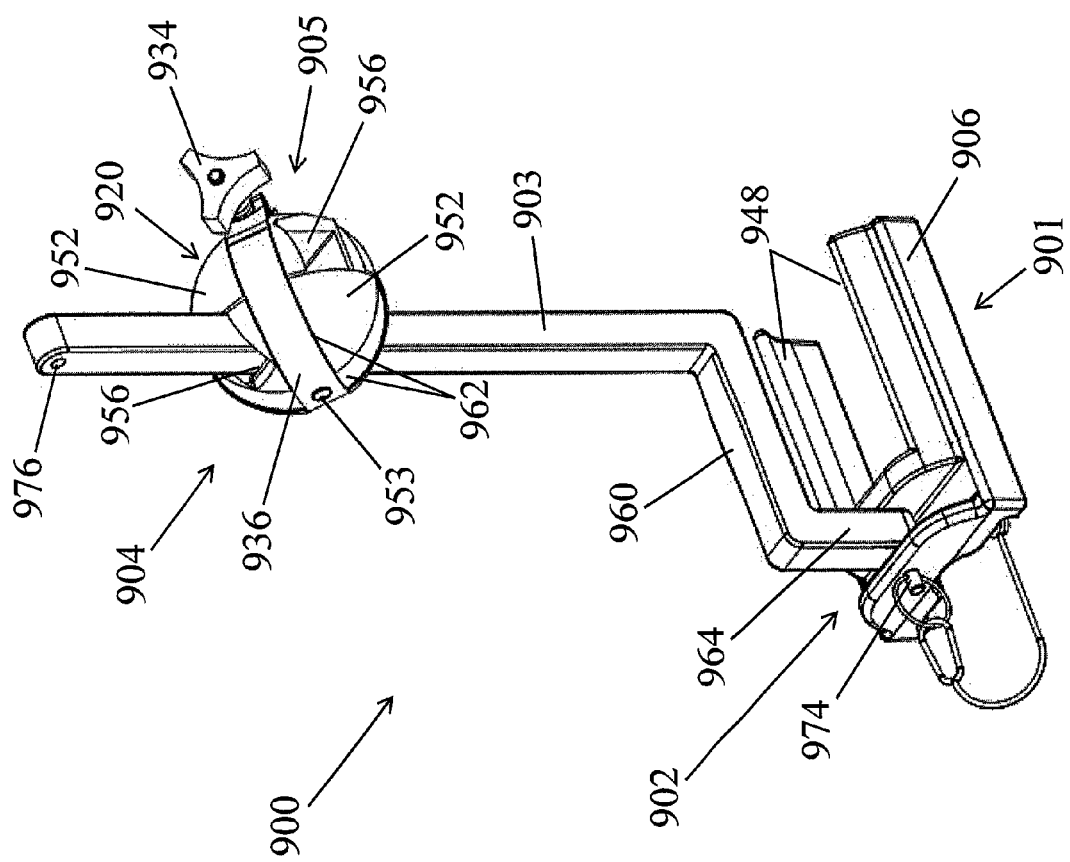
FIG. 9 depicts a foot pedal arrestor of the invention.
Figure 10:
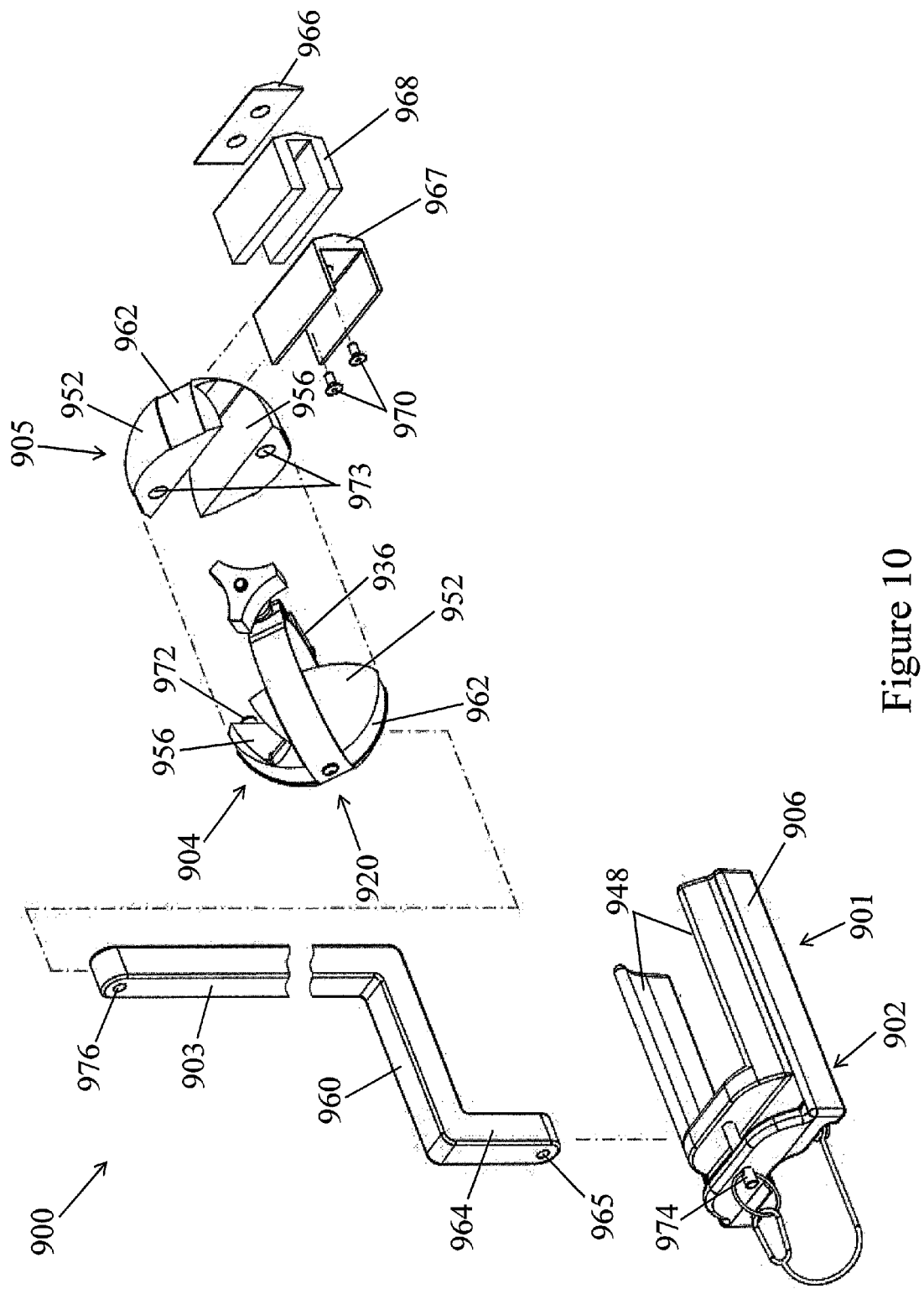
FIG. 10 is an exploded view of the foot pedal arrestor of FIG. 9 and small, medium, and large adapter inserts for use therewith.

FIG. 10 is an exploded view of the foot pedal arrestor 900 of FIG. 9. Also depicted in FIG. 10 are a large member adapter insert 966, a medium member adapter insert 967, and a small member adapter insert 968, any one of which can be inserted into the clamping mechanism 920 and affixed with screws 970 to the inside of an adjustment notch 956 to allow for variations in the cross sectional size of a structural member of an attached keyboard stand or attached object. FIG. 10 also depicts positioning lugs 972 and corresponding positioning holes 973 to properly align the two halves 952 of the clamping mechanism 920 when assembled with the strap clamp 936. As shown, the clamping mechanism 920 would position the distance spanning shaft 903 at approximately 90 degrees to the major inline dimension of a structural member of a keyboard stand or attached object.

The distance spanning shaft 903 also includes an extender arm 960 that allows for a longitudinal positioning that is offset from the foot pedal capture fitting and from the axis of the spanning shaft 903. As best understood by comparing FIG. 9 with the exploded view of FIG. 10, the engagement arm 964 leads from the offset of the extender arm 960 to engage a quick release pin 974 of the foot pedal capture fitting 901 at the engagement arm hole 965. This direct attachment forms the foot pedal capture lock 902 of an integrated and combined capture lock 902 and foot pedal capture fitting 901, the configuration of which also allows for several optional configurations of the foot pedal arrestor 900 by the user.

For example, the relative positioning of the engagement arm hole 965 and quick release pin 974 allow for the foot pedal capture fitting 901 to be rotated 180 degrees for optional placement of a pedal to either side of the distance spanning shaft 903. The spanning shaft 903 itself can also be removed from the clamping mechanism 920, rotated about its major axis 180 degrees, and reinserted into the clamping mechanism 920 so that the quick release pin 974 engages the engagement arm hole 965 and thereby repositions the foot pedal capture fitting 901 at a different position that is equal to approximately two lengths of the extender arm 960 away from the previous position. The spanning shaft 903 can also be removed and reinserted upside down in the clamping mechanism 920 so that spanning shaft hole 976 at the opposite end of the spanning shaft instead engages the quick release pin 974, allowing the point of connection between the spanning shaft 903 and foot pedal capture fitting to be located along the major dimensional axis of the spanning shaft 903. In addition, the possible mounting of the arrestor 900 to a keyboard stand having several structural members, such as the keyboard stand 301 in FIG. 3 and keyboard stand 860 in FIG. 8, provide several optimal mounting locations. By mixing and combining such different mounting options, numerous different positionings of the foot pedal capture fitting and any positioned foot pedal can be achieved.

The foot pedal arrestor of FIGS. 9 and 10 also features a yoke 906 of the foot pedal capture fitting 901 similar to that depicted in FIG. 5 and constructed with a universal shape including inside contact contours 948 that allow for the proper fitting to most available foot pedals without further adjustment, eliminating the need for adjustment pins.

It will be further appreciated that in some contemplated embodiments, the invention can also be used to capture and provide static positioning of devices other than a foot pedal. For example, the arrestor could be used to suspend a computer or calculator at a convenient position for operation with respect to another apparatus. When needed, the capture fitting can be modified to accommodate whatever device or apparatus might need to be captured and held in a static position.

Because the arrestor can be robustly built, it is ideal for use as a positioning support for apparatuses other than foot pedals. For example, with modification to the capture fitting such as making it wider and/or deeper, the apparatus can be used as a position adjustable computer support.

Additionally, for example, the arrestor apparatus can be modified and used to suspend musical instruments in a multi-instrument performance configuration where the position of each instrument needs to be adjusted for the physical reach and size of a musical performer.

In other contemplated embodiments, the arrestor can be configured to position something as simple as a common switch adjustably within reach of a user.

This invention has been described with reference to several preferred embodiments. Many modifications and alterations will occur to others upon reading and understanding the preceding specification. It is intended that the invention be construed as including all such alterations and modifications in so far as they come within the scope and spirit of the appended claims or the equivalents of the claims.

The invention claimed is:

1. An arrestor for restricting movement of a user operated device electrically connected to a device operated by the user operated device comprising:
   capture fitting means for capturing the user operated device and for restricting the movement of the user operated device relative to said arrestor;
   a distance spanning shaft;
   capture lock means connected to capture fitting means for positioning said capture fitting means relative to said distance spanning shaft;
   fixed connection locator means for attaching said arrestor statically to an adjacent structure and for positioning said arrestor relative to the adjacent structure; and
   locking joint means connected to said distance spanning shaft for locking said distance spanning shaft to a position relative to said fixed connection locator means to restrict the movement of the user operated device relative to the adjacent structure.

2. The arrestor of claim 1 wherein said arrestor is a foot pedal arrestor and the user operated device is a foot pedal.

3. The arrestor of claim 1 wherein said arrestor is a foot pedal arrestor, the user operated device is a foot pedal, and the adjacent structure is a keyboard stand.

4. The arrestor of claim 1 wherein the user operated device is one from the group consisting of a controller for industrial equipment, a sewing machine pedal, a musical instrument pedal, a boat motor controller, a calculator, a computer control, a vehicle pedal, and an electrical switch.

5. The arrestor of claim 1 wherein said capture fitting means includes pins for securing and further restricting movement of said user operated device with respect to said capture fitting means.

6. The arrestor of claim 1 further wherein said capture lock means includes a friction fitting and a friction disk, each of said friction fitting and said friction disk having a friction surface, said friction surface of said friction disk being in frictional engagement with said friction surface of said friction fitting to further restrict movement of said capture fitting means with respect to said distance spanning shaft.

7. The arrestor of claim 1 wherein said locking joint means is a locking spherical joint.

8. The arrestor of claim 1 wherein said fixed connection locator means includes a clamping mechanism including two clamp arms connected at a clamp pivot.

9. The arrestor of claim 1 wherein said arrestor suspends the user operated device in a fixed position above a floor level.

10. The arrestor of claim 1 wherein said capture fitting means is positioned to restrict movement of the user operated device while the user operated device is positioned at floor level.

11. A foot pedal arrestor for restricting movement of a keyboard foot pedal, comprising:
    a foot pedal capture fitting means for attaching the foot pedal to said foot pedal arrestor and for restricting the movement of said foot pedal relative to said foot pedal arrestor;

a distance spanning shaft;

a foot pedal capture lock means for positioning said foot pedal capture fitting means relative to said distance spanning shaft;

a fixed connection locator means having a clamping mechanism for attaching said foot pedal arrestor statically to a keyboard stand and for positioning said foot pedal arrestor to a fixed position relative to the keyboard stand; and a locking joint means for locking said distance spanning shaft to a fixed position with respect to said fixed connection locator means and for restricting movement of the foot pedal relative to the keyboard stand.

12. The foot pedal arrestor of claim 11 wherein said locking joint means is a locking spherical joint.

13. The foot pedal arrestor of claim 11, wherein said foot pedal capture fitting means includes pins for securing and further restricting movement of said foot pedal with respect to said foot pedal capture fitting means.

14. The foot pedal arrestor of claim 11 wherein said foot pedal capture lock means includes a friction fitting and a friction disk, each of said friction fitting and said friction disk having a friction surface, said friction surface of said friction disk being in frictional engagement with said friction surface of said friction fitting to further restrict movement of said foot pedal capture fitting means with respect to said distance spanning shaft.

15. The foot pedal arrestor of claim 11 wherein said fixed connection locator means includes a clamping mechanism including two clamp arms connected at a clamp pivot.

16. The foot pedal arrestor of claim 11 wherein said foot pedal arrestor suspends the foot pedal in a fixed position above the floor level.

17. The foot pedal arrestor of claim 11 wherein said foot pedal capture fitting means is positioned to restrict movement of the foot pedal while the foot pedal is positioned at floor level.

\* \* \* \* \*